US010576510B2

(12) United States Patent
Donovan et al.

(10) Patent No.: US 10,576,510 B2
(45) Date of Patent: Mar. 3, 2020

(54) RECOATER CLEANING SYSTEM

(71) Applicant: Delavan Inc, West Des Moines, IA (US)

(72) Inventors: Matthew Donovan, Ankeny, IA (US); Danielle Douskey, West Des Moines, IA (US); Andy W. Tibbs, Earlham, IA (US)

(73) Assignee: DELAVAN, INC., West Des Moines, IA (US)

( * ) Notice: Subject to any disclaimer, the term of this patent is extended or adjusted under 35 U.S.C. 154(b) by 16 days.

(21) Appl. No.: 15/606,490

(22) Filed: May 26, 2017

(65) Prior Publication Data

US 2018/0339467 A1      Nov. 29, 2018

(51) Int. Cl.
*B08B 5/02*       (2006.01)
*B33Y 40/00*     (2015.01)
*B29K 105/00*   (2006.01)

(52) U.S. Cl.
CPC .............. *B08B 5/02* (2013.01); *B33Y 40/00* (2014.12); *B29K 2105/251* (2013.01)

(58) Field of Classification Search
CPC ........... B08B 5/02; B29C 64/35; B33Y 10/00; B33Y 30/00; B18C 67/96
See application file for complete search history.

(56) References Cited

U.S. PATENT DOCUMENTS

| 9,586,290 | B2 | 3/2017 | Buller et al. | |
| 2016/0167091 | A1* | 6/2016 | Williams | B08B 5/02 134/18 |
| 2017/0014911 | A1 | 1/2017 | Ng et al. | |
| 2017/0072468 | A1 | 3/2017 | Schilling et al. | |
| 2017/0182711 | A1* | 6/2017 | Ederer | B33Y 70/00 |
| 2017/0252817 | A1* | 9/2017 | Mykulowycz | B22F 3/115 |

FOREIGN PATENT DOCUMENTS

| DE | 102014010929 A1 | 1/2016 | |
| EP | 2527149 A1 | 11/2012 | |
| WO | WO-2015170330 A1 | 11/2015 | |
| WO | WO-2016084351 A1 | 6/2016 | |
| WO | WO-2018087474 A1 * | 5/2018 | ............... B08B 5/02 |

OTHER PUBLICATIONS

Extended European Search Report, prepared by Examiner Monica Lozza of the European Patent Office, dated Oct. 17, 2018, in corresponding European Patent Application No. 18173720.6.

* cited by examiner

*Primary Examiner* — Mikhail Kornakov
*Assistant Examiner* — Natasha N Campbell
(74) *Attorney, Agent, or Firm* — Locke Lord LLP; Daniel J. Fiorello; Scott D. Wofsy (57) ABSTRACT

A system for cleaning an additive manufacturing machine recoater includes a position module for sensing and/or determining a position of a recoater of the additive manufacturing machine and a gas manifold disposed in the additive manufacturing machine and configured to spray a pressurized gas on the recoater when the recoater is in at least one cleaning position. The system includes a valve configured to allow the pressurized gas to flow from a gas source to the gas manifold, and a valve control module configured to control the valve as a function of the position sensed and/or determined by the position module.

12 Claims, 6 Drawing Sheets

RECOATER CLEANING SYSTEM

BACKGROUND

1. Field

The present disclosure relates to additive manufacturing, more specifically to a system for cleaning a recoater (e.g., a roller type).

2. Description of Related Art

Many powder bed fusion systems have problems with contaminants generated during the PBF process. Some of these contaminants are the feedstock the system itself uses to grow parts. Excess or loose powder in the build area can fall into the fusion area, causing incomplete or improper fusion, resulting in failed builds. To reduce these contaminants in the vicinity of the build area, particulates are sprayed off the build area using pressurized inert gas during lasing, but this sprays particulates and off-gas onto the recoater, e.g., a roller recoater.

In certain systems, after a certain intervals (e.g., every 40 or 80 layers of recoating), the roller moves further left of the zero position and the bottom of the roller contacts a scraper to scrape off gunk that has built up on the roller. This system does not clean the top of the roller.

Such conventional methods and systems have generally been considered satisfactory for their intended purpose. However, there is still a need in the art for improved recoater cleaning systems. The present disclosure provides a solution for this need.

SUMMARY

In accordance with at least one aspect of this disclosure, a system for cleaning an additive manufacturing machine recoater includes a position module for sensing and/or determining a position of a recoater of the additive manufacturing machine and a gas manifold disposed in the additive manufacturing machine and configured to spray a pressurized gas on the recoater when the recoater is in at least one cleaning position. The system includes a valve configured to allow the pressurized gas to flow from a gas source to the gas manifold, and a valve control module configured to control the valve as a function of the position sensed and/or determined by the position module.

The system can include a controller for controlling one or more components of the additive manufacturing machine, wherein the controller includes the valve control module. The controller can include the position module.

The valve control module can be configured to open the valve when the recoater is at one or more selected positions. The one or more selected positions can include a cleaning position.

The cleaning position can be behind a zero position of normal operation. The position module can include a position sensor configured to sense when the recoater is in a selected position.

The gas manifold can include a pipe that extends in the direction of the recoater. The gas manifold can be positioned above the recoater within the additive manufacturing machine. The gas manifold can be positioned to spray gas in a direction away from one or both of a build area and a powder bed.

In accordance with at least one aspect of this disclosure, a method comprises sensing and/or determining a position of a recoater of an additive manufacturing machine, determining whether the position of the recoater is one or more selected positions for cleaning, wherein if the position of the recoater is a selected position, opening a valve to allow a pressurized gas to flow through a cleaning manifold to spray on the recoater to clean the recoater. The one or more selected position can include beyond a zero position of normal operation of the recoater.

The one or more selected position can be created and/or selected by a user. The method can include determining an interval of recoating, wherein if the interval of recoating is a selected interval of recoating, and if the position of the recoater is a selected position, opening a valve to allow a pressurized gas to flow through a cleaning manifold to spray on the recoater to clean the recoater.

A non-transitory computer readable medium can include computer executable instruction for executing any suitable method and/or portion thereof as described herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
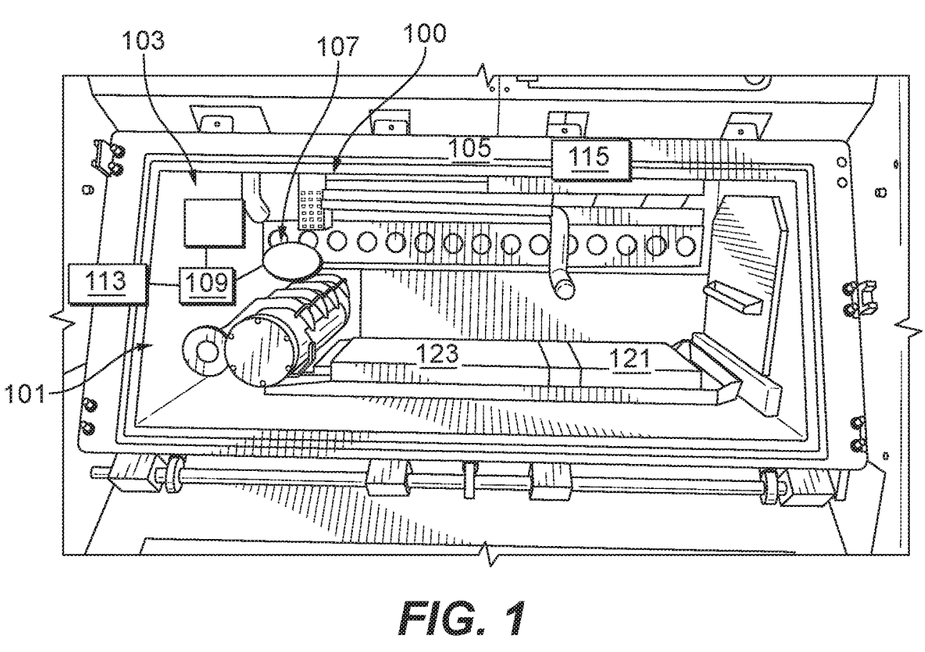
FIG. 1 is a perspective view of an embodiment of an additive manufacturing machine including an embodiment of a system in accordance with this disclosure.
Figure 2A:
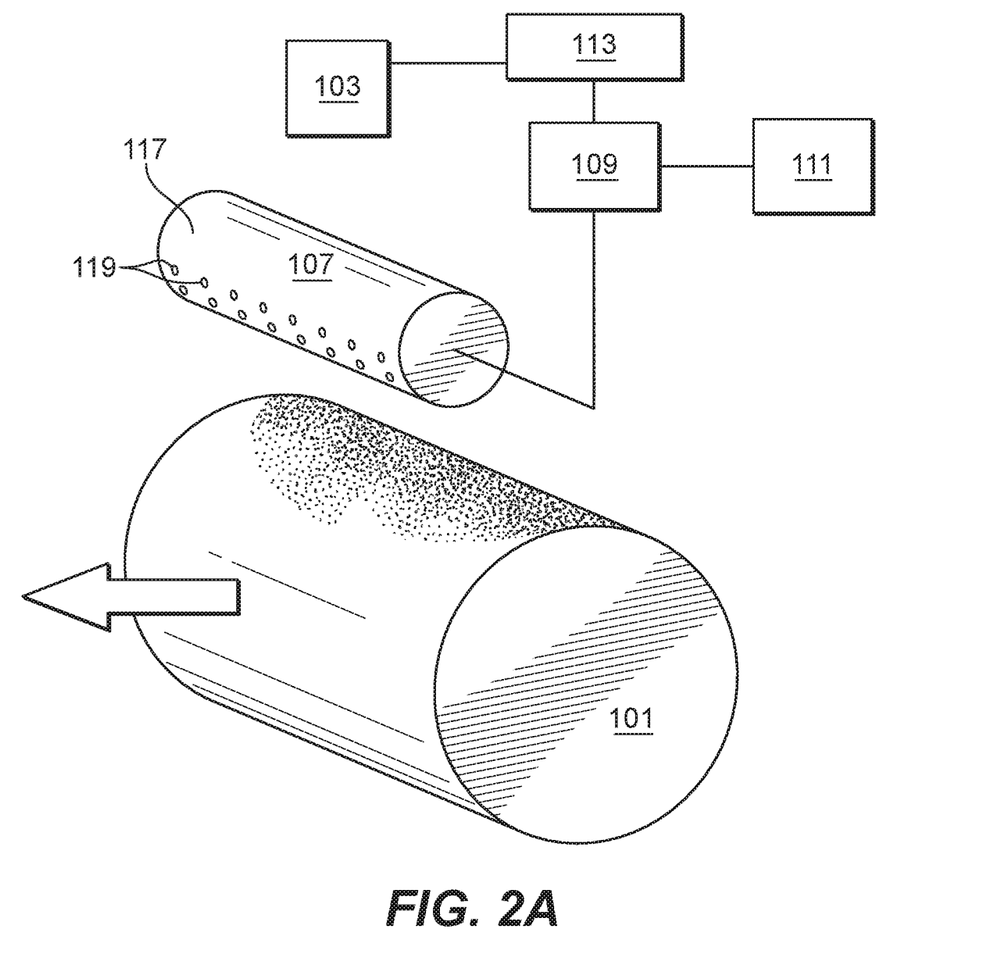
FIG. 2A is a schematic perspective view of an embodiment of a system in accordance with this disclosure, wherein a recoater is shown moving toward a cleaning position from a build area and/or powder bed area.
Figure 2B:
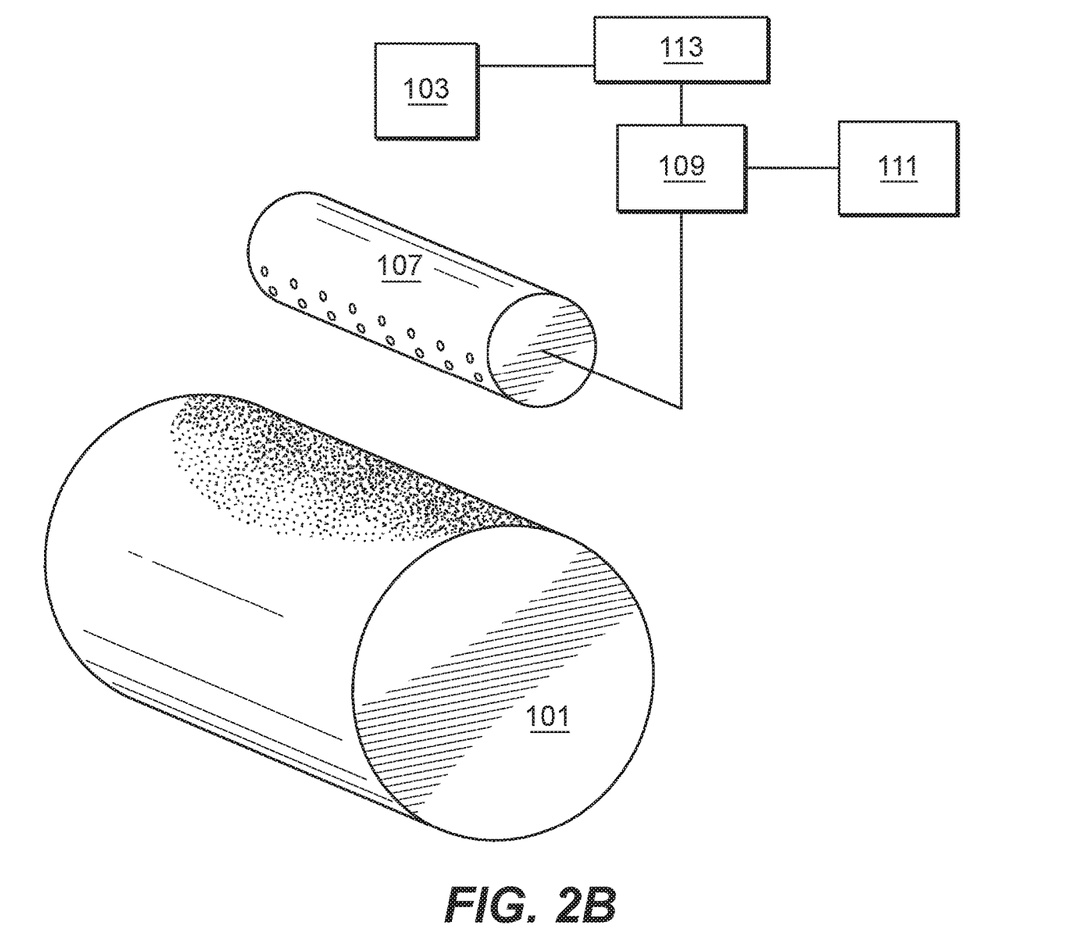
FIG. 2B is a schematic perspective view of the embodiment FIG. 2A, wherein the recoater is shown in a cleaning position and the valve is closed.
Figure 2C:
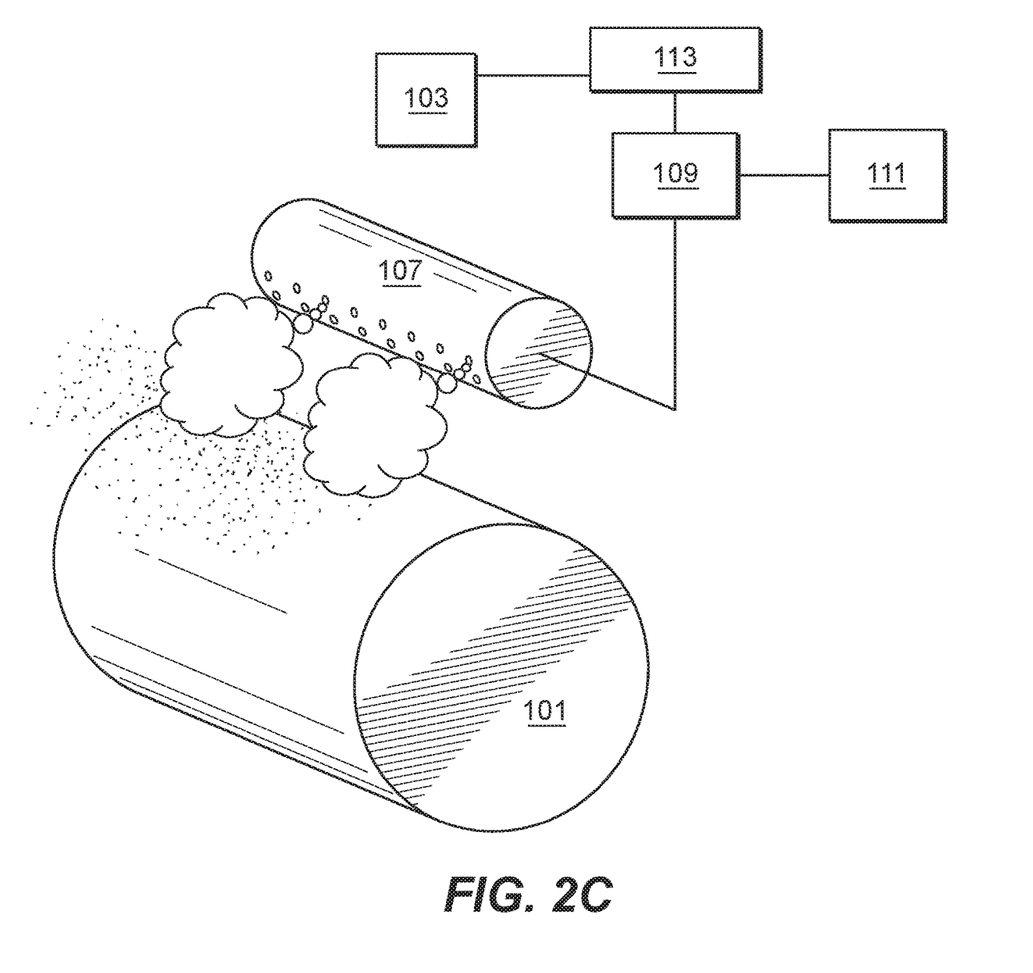
FIG. 2C is a schematic perspective view of the embodiment FIG. 2A, wherein the recoater is shown in a cleaning position and the valve is open allowing gas to flow therethrough.
Figure 2D:
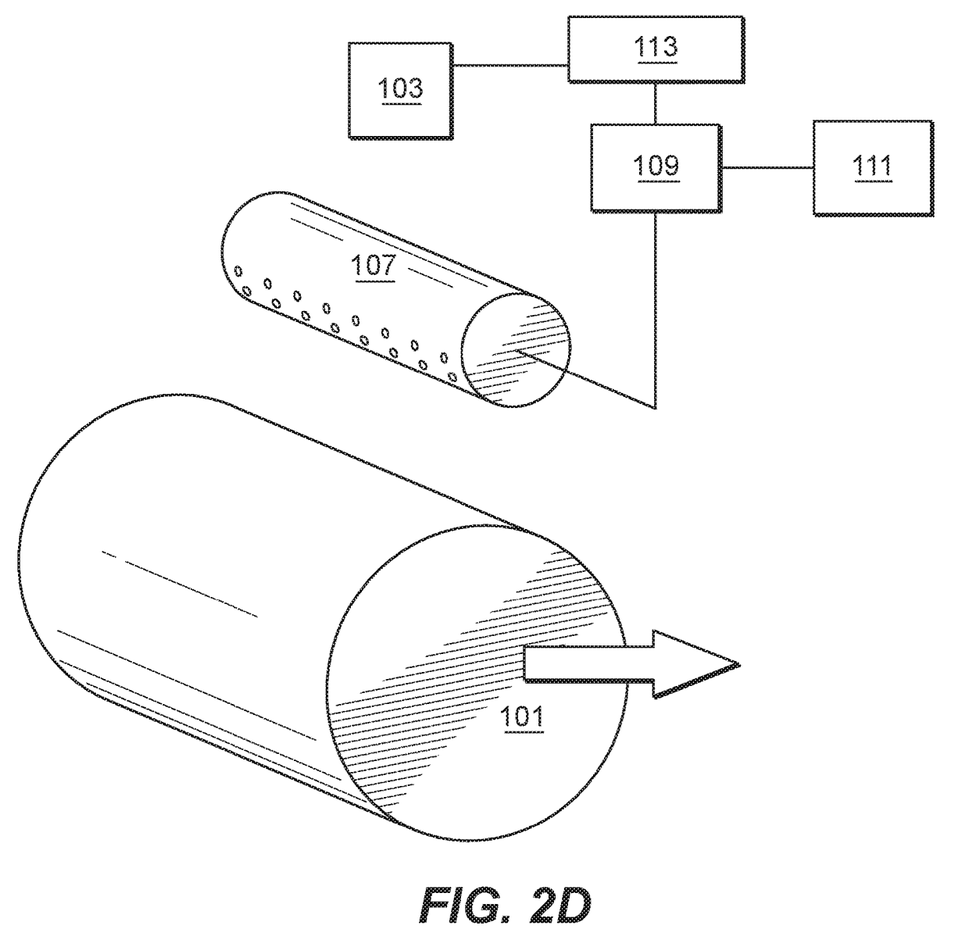
FIG. 2D is a schematic perspective view of the embodiment FIG. 2A, wherein the recoater is shown moving away from a cleaning position toward a powder bed area and/or a build area.
Figure 3:
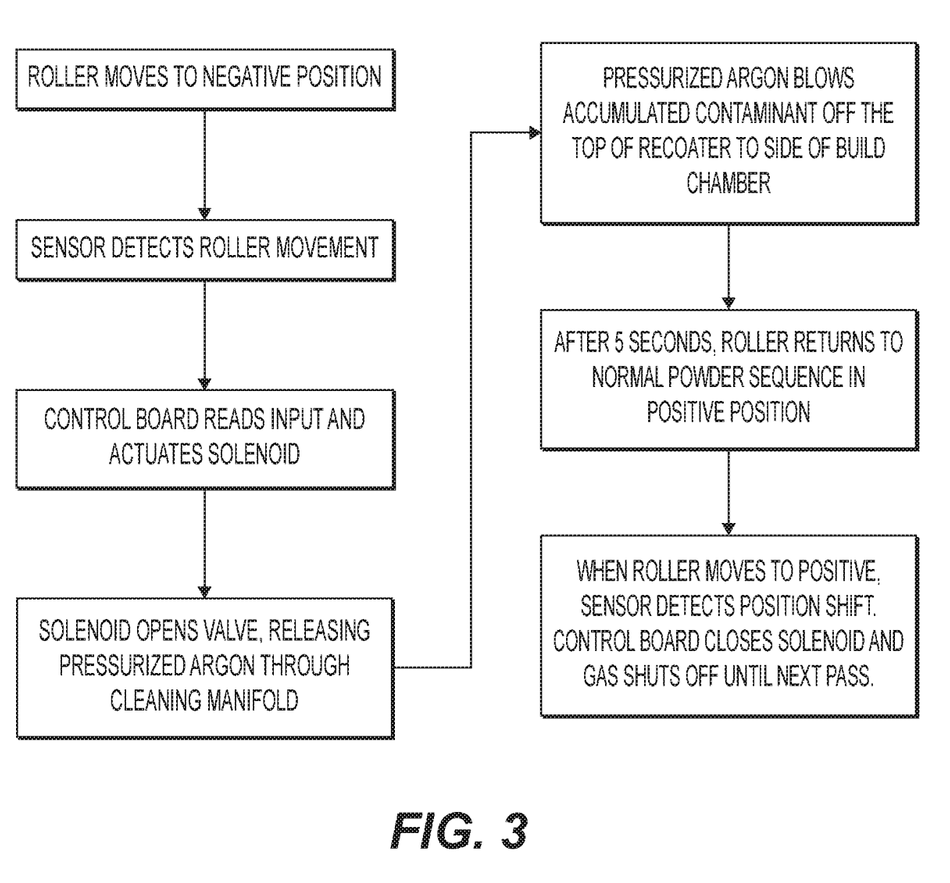
FIG. 3 is a flow diagram of an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A-3. The systems and methods described herein can be used to improve additive manufacturing and/or reduce build failure, e.g., in powder bed fusion additive manufacturing machines.

In accordance with at least one aspect of this disclosure, referring to FIG. 1, a system 100 for cleaning an additive manufacturing machine recoater 101 includes a position module 103 for sensing and/or determining a position of a recoater 101 of the additive manufacturing machine 105. The position module 103 can be embodied as and/or include any suitable hardware (e.g., a suitable position sensor, a microprocessor, or any other suitable circuitry) and/or software (e.g., any suitable software code of any suitable programming language) as appreciated by those having skill in the art.

For example, in certain embodiments, the position module 103 can include a sensor (e.g., an infrared sensor, a limiter switch) for sensing the position of the recoater 101 (e.g., such as a limiter switch for detecting when it has reached a selected position). In certain embodiments, the position module 103 can be a component of a controller 109 (described below) that can control the recoater 101 such that position of the recoater can be determined based on control inputs, timing, or any other suitable position determination.

The system 100 further includes a gas manifold 107 disposed in the additive manufacturing machine and configured to spray a pressurized gas on the recoater 101 when the recoater 101 is in at least one cleaning position. The gas manifold 107 can be configured to be disposed in any suitable position in the additive manufacturing machine 105 and can include any suitable shape and outlets. For example, referring to FIGS. 2A-2D, the gas manifold can include a pipe 117 that extends in the direction of the recoater 101. As shown, the pipe 117 can includes a plurality of outlet holes 119. Embodiments of manifolds 107 can include a long channel and/or any other suitable shape. Embodiments can effuse gas at an angle to push gunk away from the feed stock (right to left in FIG. 1), but any other suitable configuration is contemplated herein.

As shown, the gas manifold 107 can be positioned above the recoater 101 within the additive manufacturing machine 105. The gas manifold 107 can be positioned to spray gas in a direction away from one or both of a build area 121 and a powder bed 123. Any suitable number of gas manifolds 107 is contemplated herein.

The system 100 includes a valve 109 configured to allow the pressurized gas to flow from a gas source 111 to the gas manifold 107. The gas source 111 can include any suitable type of gas (e.g., an inert gas such as argon or any other suitable gas). The valve 109 can include any suitable valve type and/or number of valves (e.g., a solenoid controlled valve).

The system 100 can also include a valve control module 113 configured to control the valve 109 as a function of the position sensed and/or determined by the position module 103. The valve control module 113 can be embodied as and/or include any suitable hardware (e.g., a microprocessor or any other suitable circuitry) and/or software (e.g., any suitable software code of any suitable programming language) as appreciated by those having skill in the art. It is contemplated that the valve control module 109 and the position module 103 can be integrated together in a single hardware and/or software package in any suitable configuration.

The valve control module 113 can be configured to open the valve 109 when the recoater 101 is at one or more selected positions. For example, the one or more selected positions can include a cleaning position, however it is contemplated that the valve 109 can be configured to open at any suitable position of the recoater (e.g., manually by a user or automatically for any other suitable purpose). The valve control module 113 can control spray characteristics (e.g., spray length, spray direction and/or variance thereof, which of a plurality of manifolds is actuated at a particular moment) which can include any suitable characteristics and/or user defined.

The system 100 can include a controller 115 for controlling one or more components of the additive manufacturing machine 105. The controller 115 can control the recoater 101 and/or any other suitable system(s) of the additive manufacturing machine 105. In certain embodiments, the controller 115 includes the valve control module 109 (e.g., as a hardware component and/or as a software component). The controller 115 can also include the position module 103 in certain embodiments (e.g., as a hardware component and/or as a software component).

In certain embodiments, the cleaning position can be behind a zero position of normal operation. For example, certain additive manufacturing machines are configured to cause a recoater 101 to move (e.g., as shown in FIG. 2A) past a normal zero position of the recoater stroke (e.g., to the left of a zero position as shown in the orientation in FIG. 1) which can allow for a lower portion of the recoater 101 to be cleaned by a separate system. While the recoater 101 is in such a position, or any other suitable position, the position module 103 can send a signal to the valve control module 113 which can cause the valve 109 to be opened, thereby allowing other portions (e.g., the top) of the recoater 101 to be cleaned by gas from the manifold 107 (e.g., as shown in FIGS. 2B and 2C). After cleaning, the recoater 101 can be returned to normal operation (e.g., as shown in FIG. 2D) to recoat the build area 121.

The system 100 can be configured to be used with any suitable type of recoater 101. For example, the recoater 101 can include a roller type recoater system as appreciated by those having skill in the art. Any other suitable type of recoater is contemplated herein.

In accordance with at least one aspect of this disclosure, a method comprises sensing and/or determining a position of a recoater 101 of an additive manufacturing machine 105, determining whether the position of the recoater 101 is one or more selected positions for cleaning, wherein if the position of the recoater 101 is a selected position, opening a valve 109 to allow a pressurized gas to flow through a cleaning manifold 107 to spray on the recoater 101 to clean the recoater 101. The one or more selected position can include beyond a zero position of normal operation of the recoater.

The method can include determining an interval of recoating, wherein if the interval of recoating is a selected interval of recoating, and if the position of the recoater 101 is a selected position, opening a valve 109 to allow a pressurized gas to flow through the cleaning manifold 107 to spray on the recoater 101 to clean the recoater 101. This way, if one or more of the selected positions are in the normal stroke of the recoater 101, then the system 100 can control how frequently the gas is used to clean the recoater 101 (e.g., once every 40 or 80 cycles).

In certain embodiments, the selected position and/or cleaning position is not necessarily a physical position of the recoater 101, but can be a machine position, e.g., at a time tin cycle of recoating, the valve 109 can be opened. In certain embodiments, the one or more selected position can be created and/or selected by a user.

FIG. 3 shows an embodiment of a method in accordance with this disclosure, however, any suitable embodiments of a method using any suitable embodiments of a system 100 as described above are contemplate herein. In the embodiment of FIG. 3, the recoating system engages a roller scraper every so often (e.g., 40 layers). During this sequence, the recoater roller moves to a negative position which scrapes roller of buildup. Embodiments of the system 100 can be designed to operate in conjunction with this operation and can perform as a "bolt-on" system. The position module can detect negative axis movement of recoater and triggers a valve solenoid to activate. Then, a compressed inert gas can feed a distribution manifold, e.g., through side access ports. The gas manifold 107 then blows inert gas over recoater 101 removing excess powder/contaminants. The roller moves to negative position As shown in the embodiment of FIG. 3, a sensor detects roller movement, a control board reads input and actuates solenoid, and a solenoid opens valve, thereby releasing pressurized gas through cleaning manifold. Pressurized gas blows accumulated contaminant off the top of recoater to side of build chamber. When roller moves to positive, the sensor detects position shift and the valve control module can close the solenoid and gas shuts off until the next interval. After 5 seconds, the roller returns to normal powder sequence in positive position.

In accordance with at least one aspect of this disclosure, a non-transitory computer readable medium can include computer executable instruction for executing any suitable method and/or portion thereof as described hereinabove.

As will be appreciated by those skilled in the art, aspects of the present disclosure may be embodied as a system, method or computer program product. Accordingly, aspects of the this disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

As described above, embodiments prevent a current failure mode that is one of the most common causes of build failures in a powder bed fusion system. Embodiments include a mechanical and electrical system that may be integrated into a powder bed fusion system. Certain embodiments are configured for use with a roller recoater based system but can be configured for multiple blade and wiper recoating systems as well, or any other suitable system. Embodiments can be inserted into the build chamber at the negative x axis travel position of the recoating mechanism. Periodically throughout the build, in embodiments when the recoater travels to negative X position to scrape the roller, embodiments can engage a limit switch and activate a vacuum and inert gas pneumatic blast that will clear excess feedstock and contaminants from the recoater and push them into a benign area of the build chamber for later removal, and prevent this material from falling into the build area.

The methods and systems of the present disclosure, as described above and shown in the drawings, provide for additive manufacturing machines with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system for cleaning an additive manufacturing machine recoater, comprising:
   a position module for sensing and/or determining a position of a recoater of the additive manufacturing machine;
   a gas manifold disposed in the additive manufacturing machine and configured to spray a pressurized gas on the recoater when the recoater is in at least one cleaning position;
   a valve configured to allow the pressurized gas to flow from a gas source to the gas manifold; and
   a valve control module configured to control the valve as a function of the position sensed and/or determined by the position module, wherein the valve control module is configured to open the valve when the recoater is at one or more selected positions, wherein the one or more selected positions include a cleaning position, wherein the cleaning position is behind a zero position of normal operation of the recoater, wherein the gas manifold is positioned above the recoater within the additive manufacturing machine.

2. The system of claim 1, comprising a controller for controlling one or more components of the additive manufacturing machine, wherein the controller includes the valve control module.

3. The system of claim 2, wherein the controller includes the position module.

4. The system of claim 1, wherein the position module includes a position sensor configured to sense when the recoater is in a selected position.

5. The system of claim 1, wherein the gas manifold includes a pipe that extends in the direction of the recoater.

6. The system of claim 1, wherein the gas manifold is positioned to spray gas in a direction away from one or both of a build area and a powder bed.

7. A method, comprising:
   sensing and/or determining a position of a recoater of an additive manufacturing machine;
   determining whether the position of the recoater is one or more selected positions for cleaning;
   wherein if the position of the recoater is a selected position, opening a valve to allow a pressurized gas to flow through a cleaning manifold to spray on the recoater to clean the recoater, wherein the one or more selected positions includes behind a zero position of normal operation of the recoater, wherein the gas manifold is positioned above the recoater within the additive manufacturing machine.

8. The method of claim 7, wherein the one or more selected position can be created and/or selected by a user.

9. The method of claim 7, further comprising determining an interval of recoating, wherein if the interval of recoating is a selected interval of recoating, and if the position of the recoater is a selected position, opening a valve to allow a pressurized gas to flow through a cleaning manifold to spray on the recoater to clean the recoater.

10. A non-transitory computer readable medium, comprising computer executable instruction for executing a method, the method including:
    sensing and/or determining a position of a recoater of an additive manufacturing machine;
    determining whether the position of the recoater is one or more selected positions for cleaning;
    wherein if the position of the recoater is a selected position, opening a valve to allow a pressurized gas to flow through a cleaning manifold to spray on the recoater to clean the recoater, wherein the one or more selected positions includes behind a zero position of normal operation of the recoater, wherein the gas manifold is positioned above the recoater within the additive manufacturing machine.

11. The non-transitory computer readable medium of claim 10, wherein the one or more selected position can be created and/or selected by a user.

12. The non-transitory computer readable medium of claim 10, wherein the method further comprises determining an interval of recoating, wherein if the interval of recoating is a selected interval of recoating, and if the position of the recoater is a selected position, opening a valve to allow a pressurized gas to flow through a cleaning manifold to spray on the recoater to clean the recoater.

* * * * *